(12) United States Patent
Cunningham et al.

(10) Patent No.: US 11,527,932 B2
(45) Date of Patent: *Dec. 13, 2022

(54) METHOD FOR PRODUCING A STATOR FOR AN ELECTRIC MACHINE

(71) Applicant: Mahle International GmbH, Stuttgart (DE)

(72) Inventors: John Cunningham, Muxton Telford (GB); Philip Grabherr, Stuttgart (DE); Ian Webb, Telford (GB); Tim Male, Telford (GB); Stojan Markie, Kojsko (SI); Sentance Graham, Stanford (GB); Peter Sever, Murska Sobota (SI); Josef Sonntag, Nuertingen (DE); Jon Witcombe, Old Telford (GB)

(73) Assignee: Mahle International GmbH

( * ) Notice: Subject to any disclaimer, the term of this patent is extended or adjusted under 35 U.S.C. 154(b) by 226 days.

This patent is subject to a terminal disclaimer.

(21) Appl. No.: 16/769,578

(22) PCT Filed: Nov. 15, 2018

(86) PCT No.: PCT/EP2018/081527
§ 371 (c)(1),
(2) Date: Jun. 3, 2020

(87) PCT Pub. No.: WO2019/110272
PCT Pub. Date: Jun. 13, 2019

(65) Prior Publication Data
US 2020/0373799 A1 Nov. 26, 2020

(30) Foreign Application Priority Data
Dec. 4, 2017 (DE) .......................... 102017221808.8

(51) Int. Cl.
*H02K 3/24* (2006.01)
*H02K 9/19* (2006.01)
(Continued)

(52) U.S. Cl.
CPC ............... *H02K 3/24* (2013.01); *H02K 5/203* (2021.01); *H02K 9/19* (2013.01); *H02K 15/12* (2013.01)

(58) Field of Classification Search
CPC ...... H02K 15/12; H02K 15/10; H02K 15/105; H02K 3/24
See application file for complete search history.

(56) References Cited

U.S. PATENT DOCUMENTS 6,903,471 B2 6/2005 Arimitsu et al.
8,541,923 B2 9/2013 Leiber et al.
(Continued)

FOREIGN PATENT DOCUMENTS

CH       413077 A   5/1966
CN     1515060 A   7/2004
(Continued)

OTHER PUBLICATIONS

Machine Translation of EP 1780872 A2 (Year: 2007).*
(Continued)

*Primary Examiner* — Quyen P Leung
*Assistant Examiner* — Christopher S Leone
(74) *Attorney, Agent, or Firm* — Fishman Stewart PLLC (57) ABSTRACT

A method for producing a stator may include providing an annular stator body including a plurality of stator teeth arranged spaced apart from one another. The method may also include at least partially overmoulding at least two adjacent stator teeth with a first plastic mass. The method may further include arranging at least one stator winding on at least one stator tooth of the at least two stator teeth and (Continued)

fixing the at least one stator winding on the at least one stator tooth via at least partially overmoulding the at least one stator winding with a second plastic mass. The method may additionally include, prior to fixing the at least one stator winding, introducing a mask into an intermediate space defined between the at least two stator teeth to cover a surface portion of the stator body bounding the intermediate space radially outside.

29 Claims, 7 Drawing Sheets

(51) Int. Cl.
*H02K 15/12* (2006.01)
*H02K 5/20* (2006.01)

(56) References Cited

U.S. PATENT DOCUMENTS

| | | | |
|---|---|---|---|
| 2008/0042498 A1* | 2/2008 | Beer | H02K 5/128 310/43 |
| 2008/0136271 A1* | 6/2008 | Alfermann | H02K 3/24 310/59 |
| 2009/0022610 A1 | 1/2009 | Materne et al. | |
| 2012/0242176 A1* | 9/2012 | Pal | H02K 1/20 310/43 |
| 2014/0292118 A1 | 10/2014 | Takahashi | |

FOREIGN PATENT DOCUMENTS

| | | | | |
|---|---|---|---|---|
| CN | 102422512 A | 4/2012 | | |
| DE | 102006029803 A1 | 1/2008 | | |
| EP | 1780872 A2 * | 5/2007 | | H02K 15/0018 |
| EP | 1780872 A2 | 5/2007 | | |
| JP | H04-364343 A | 12/1992 | | |

OTHER PUBLICATIONS

English abstract for EP-1780872.
English abstract for DE-102006029803.
English abstract for JP-H04-364343.
Chinese Office Action dated Oct. 27, 2021 for copending Chinese App. No. 2018800740040 (with English translation).
Chinese Search Report dated Oct. 20, 2021 for copending Chinese App. No. 2018800740040.

* cited by examiner

METHOD FOR PRODUCING A STATOR FOR AN ELECTRIC MACHINE

CROSS-REFERENCE TO RELATED APPLICATIONS

This application claims priority to International Patent Application No. PCT/EP2018/081527, filed on Nov. 16, 2018, and German Patent Application No. DE 10 2017 221 808.8, filed on Dec. 4, 2017, the contents of both of which are hereby incorporated by reference in their entirety.

TECHNICAL FIELD

The invention relates to a method for producing a stator for an electric machine. The invention, furthermore, relates to a stator that has been produced by means of this method, and to an electric machine having such a stator.

BACKGROUND

Typically, conventional stators for electric machines comprise stator windings which, during the operation of the machine, are electrically energised. Such an electric machine can generally be an electric motor or a generator. The electric machine can be designed as external rotor machine or as internal rotor machine. During the operation of the machine heat is generated which, for avoiding overheating and damage or even destruction of the stator connected with this, has to be dissipated. To this end, it is known from conventional stators to equip the same with a cooling system for cooling the stator—in particular the said stator windings. Such a cooling system comprises one or more cooling passages, which are flowed through by a coolant and are arranged near the stator windings. By way of heat transfer from the stator windings to the coolant, heat can be dissipated from the stator. In this way, overheating of the stator windings and, connected with this, damage or even destruction of the stator, can be avoided.

In order to keep the production costs for providing the cooling passages mentioned above low it is known to overmould the core stacks of the stator forming the stator body including the stator teeth carrying the stator windings with a plastic mass and, during the course of the injection moulding operation, create the said cooling passages in the plastic mass. During the course of the overmoulding, the stator windings wound onto the stator teeth can be permanently fixed on the stator.

The fact that during the overmoulding of the stator body and of the windings arranged on the stator teeth it cannot be guaranteed that the windings formed so as to be electrically conductive do not lie against the—likewise electrically conductive—stator body, which are typically formed by electrically conductive shaped metal sheets that are stacked on top of one another proves to be problematic in this connection. The electrical connection between stator windings and stator body accompanied by this however causes an undesirable electrical short circuit.

This applies also for the case that is usual in practice that the stator windings are already produced with an electrical insulation, since these during the operation of the electric machine, because of high temperatures that can be caused by the high electric current flowing through the windings, can be partially damaged or even destroyed.

Likewise it cannot be excluded that the stator windings following the creation of the cooling passages by the injection moulding operation with plastic mass do not protrude into the cooling passages. In the event that the electrical insulation of the stator winding are damaged or even destroyed mentioned above, the stator windings can come into direct contact with the coolant conducted through the cooling passages, which has to be avoided in order to prevent an electrical connection of the stator windings with the coolant.

SUMMARY

It is therefore an object of the present invention to create an improved production method for producing a stator with cooling passages, with which the disadvantages mentioned above are largely or even completely overcome.

This object is solved through the subject matter of the independent claim(s). Preferred embodiments are subject matter of the dependent claim(s).

A method for producing a stator for an electric machine according to the invention comprises a first step a). According to step a), a stator is provided which comprises an annular stator body from which in turn multiple stator teeth arranged spaced from one another in a circumferential direction for receiving stator windings protrude radially to the inside. Between two stator teeth adjacent in the circumferential direction, an intermediate space, the so-called stator slot, is formed in each case.

According to a further step b), at least two stator teeth that are adjacent in the circumferential direction are at least partially overmoulded with a first plastic mass. In this way it is additionally ensured that the stator windings still to be wound onto the stator teeth are electrically insulated relative to the electrically conductive stator teeth after the winding operation.

For this reason, the circumferential sides of the stator tooth facing the intermediate spaces are preferentially overmoulded.

According to a further step c), at least one stator winding is arranged on at least one stator tooth. This operation corresponds to the winding of the stator windings onto the stator teeth. The stator windings can be realised as concentrated or distributed stator windings. According to a further step d), this at least one stator winding is fixed, i.e. permanently fastened to the stator tooth through at least partial overmoulding of this stator winding with a second plastic mass.

According to the invention, a first mask is introduced into at least one intermediate space between the two stator teeth prior to the fixing of the at least one stator winding according to step d), preferentially prior to the overmoulding with the first plastic mass according to step b). This mask covers a surface portion of the stator body bounding the intermediate space radially outside, so that the same during the overmoulding according to step d) is not covered with the second plastic mass, preferentially not with the first plastic mass either. Thus, the region filled out by the first mask forms a hollow space which following the removing of the mask can be flowed through as coolant passage by a coolant.

The cooling of the stator windings can thus take place with a stator produced by means of the method introduced here through the transport of waste heat generated in the stator windings, in particular in the axial end portions of these through the first, second and/or third plastic mass to the coolant passages formed in the stator body. There, the waste heat is absorbed by the coolant flowing through the coolant passages.

Preferably, the procedure described above is applied to multiple of the stator teeth and to multiple of the stator windings. Particularly preferably, the procedure described above is applied to all stator teeth that are present in the stator body and to all stator windings arranged on the stator teeth.

According to a preferred embodiment, the first mask is introduced into a radially outer end portion of the intermediate space concerned.

Following the introducing into the radially outer end portion of the intermediate space, the first mask particularly preferably completely fills out the radially outer end portion.

According to an advantageous further development, the method comprises an additional method step e), according to which the first mask, following the overmoulding with the second plastic mass, is again removed from the intermediate space, so that a hollow space formed following the removing of the first mask forms a coolant passage for a coolant to flow through.

According to a further preferred embodiment, the method comprises an additional method step f). According to step f), the second plastic mass bounding one of the hollow spaces or one of the coolant passages and—alternatively or additionally, the stator winding fixed on the stator tooth by means of the second plastic mass and—alternatively or additionally—a surface portion of the stator body covered by the (first) mask prior to the removal of the same is overmoulded with a third plastic mass. This is preferably carried out in such a manner that the hollow space or coolant passage is fluidically insulated, i.e. separated from the adjacent intermediate space not later than after the overmoulding with the first plastic mass. In this way, any stator windings, protruding out of the second plastic mass are insulated from the coolant flowing through the coolant passage. Preferably, this procedure can be applied to multiple of the existing hollow spaces or coolant passages. Particularly preferably, this procedure can be applied to all of the existing hollow spaces or coolant passages.

Following the carrying out of step f), the coolant passage concerned is thus preferably exclusively bounded by the third plastic mass. An impermissible electrical/mechanical contact of the stator windings with the coolant is excluded in this way.

Particularly preferably, the overmoulding with the third plastic mass is carried out in such a manner that following the overmoulding the hollow space or coolant passage is no longer bounded at any point directly by a stator winding and/or by the stator body. An impermissible electrical/mechanical contact of the stator winding with the coolant is excluded in this way.

Practically, the overmoulding with the third plastic mass is carried out after the removing of the first mask. Thus it is ensured that the surface portions of the stator body covered by the first mask are not covered with the third plastic mass.

According to a preferred embodiment, at least two stator teeth of the stator body provided in step a) that are adjacent in circumferential direction each comprise at an end portion facing away from the stator body at least one extension protruding in the circumferential direction. In this embodiment, the two extensions of the stator teeth that are adjacent in the circumferential direction are situated opposite one another in the circumferential direction. In this way, the two extensions, forming a passage slot, partially bound the intermediate space formed between the stator teeth radially inside. Prior to the overmoulding with the first plastic mass according to step b), a second mask is introduced in an additional method step c') into the passage slot and, alternatively or additionally, into a region of the intermediate space following the passage slot of the radially inner end portion radially outside. This second mask covers a surface portion of the stator body bounding the intermediate space radially inside, so that the same during the overmoulding according to step d) is not covered by the second plastic mass, preferentially not by the first plastic mass either. Thus, the region filled out by the second mask forms a hollow space out of which later on a coolant passage can be formed. Preferably, the procedure described above is applied to multiple of the stator teeth and to multiple of the stator windings. Particularly preferably, the procedure described above is applied to all of the stator teeth existing in the stator body and to all stator windings arranged on the stator teeth.

According to a further preferred embodiment, the method can comprise a further additional method step e1). According to this step e1), the second mask, following the overmoulding with the second plastic mass, is removed from the passage slot. In this way, a hollow space is created out of which a coolant passage for a coolant to flow through can be created.

According to a further advantageous further development, the method can comprise a further additional method step f1). According to the additional method step f1), the second plastic mass bounding the additional coolant passage and—alternatively or additionally—the stator winding fixed to the stator tooth by means of the second plastic mass and—alternatively or additionally—the surface portion of the stator teeth covered by the (second) mask prior to the removing of the same, is overmoulded with a third plastic mass. This is carried out in such a manner that an additional coolant passage is formed which, following the overmoulding with the third plastic mass at the latest, is fluidically separated from the adjacent intermediate space. In this way, any stator windings protruding out of the second plastic mass are insulated from the coolant flowing through the coolant passage.

Particularly preferably, the additional coolant passage is exclusively bounded by the third plastic mass. An impermissible electrical contact of the stator windings with the coolant is excluded in this way.

Practically, the overmoulding with the third plastic mass is carried out in such a manner that following the overmoulding, the hollow space or coolant passage is not directly bounded by the stator winding and/or by the stator body at any point. An impermissible electrical contact of the stator windings with the coolant is excluded in this way.

Preferentially, the second mask is designed in such a manner that it not only fills out the passage slot formed between the two stator teeth that are adjacent in the circumferential direction, but additionally protrudes radially to the outside into the remaining intermediate space between the two stator teeth. The second mask in this version additionally fills out a radially inner end portion of the intermediate space following the passage slot.

Practically, the second mask, in a cross section of the stator perpendicularly to its centre longitudinal axis, comprises a T-like geometry with a vertical and a horizontal portion. Here, the vertical portion fills out the passage slot whereas the horizontal portion fills out the radially inner end portion of the intermediate space.

The first and/or second mask prove to be particularly producible and thus cost-effective when the same by an insert preferentially formed plate-like or platelet-like, preferentially of steel.

According to an advantageous further development, the method can comprise a further following, additional method step g), according to which at least one outer circumferential side of the body can be overmoulded with a fourth plastic mass.

According to an advantageous further development, axially extending extensions provided on the outer circumferential side of the stator body are also overmoulded with the fourth plastic mass during the overmoulding according to step g), from which axially on the end side, threaded rods for fastening a receptive bearing shield to the stator body, protrude in each case.

The thermal conductivity of both thermosetting plastic and also thermoplastic is adjustable by the choice of the material composition. Thus, the thermal conductivity of a thermoplastic can be equal or greater than that of a thermosetting plastic and vice versa. Usage of thermoplastics has various advantages compared with the use of thermosetting plastics. For example, thermoplastics, as a consequence of the reversible shaping process applied during its processing are better recyclable or compared with thermosetting plastics, are less brittle and have improved damping properties. Since thermoplastics however are usually more expensive in procurement than thermosetting plastics, thermoplastics have to be employed selectively.

According to a preferred embodiment, the first and/or the second and/or the third and/or the fourth plastic mass comprises a thermoplastic or is a thermoplastic in order to exploit the abovementioned advantages.

A further preferred embodiment provides that the first and/or the second/and/or the third and/or the fourth plastic mass comprises a thermosetting plastic or is a thermosetting plastic, by way of which the cost advantages mentioned above can be exploited.

According to a further preferred embodiment, the plastic material of the first, second and/or third plastic mass therefore comprises a thermosetting plastic or is a thermosetting plastic. In contrast with this, the plastic material of the fourth plastic mass in this embodiment comprises a thermoplastic or is a thermoplastic.

According to an advantageous further development, the heat conductivity of the fourth plastic mass is lower than the heat conductivity of the first, second and/or third plastic mass.

According to an advantageous further development, the first, second and third plastic mass has the same thermal conductivity. Alternatively to this, the first, second and/or third plastic mass can each have different thermal conductivities.

According to a further advantageous further development, a coolant resistance of the third plastic mass is greater than the coolant resistance of the second or first plastic mass.

According to a further advantageous further development, the heat conductivity of the first and of the second plastic mass is higher than the heat conductivity of the third and of the fourth plastic mass.

According to another preferred embodiment, two bearing shields, located axially opposite, are fastened, in an additional method step, to the stator body, by means of the overmoulded threaded rods. This is carried out in such a manner that a first bearing shield seals a first hollow space provided in the third and/or fourth plastic mass, which forms a coolant distribution space and for this purpose fluidically communicates with the existing cooling passages. The fastening is additionally performed in such a manner that a second bearing shield seals a second hollow space provided in the third and/or fourth plastic mass, which forms a coolant collection space and for this purpose fluidically communicates with the existing cooling passages. The two bearing shields can be formed in the manner of end plates which are located opposite one another in the axial direction and axially extend the stator body. In one or in both bearing shields, a recess can be provided which expand the respective hollow space provided in the third and fourth plastic mass.

According to a further preferred embodiment, the method comprises two additional method steps h1, h2. According to the additional method step h1, a coolant distribution space and a coolant collection space are provided on and/or in the stator, which via the at least one coolant passage and/or the at least one additional coolant passage fluidically communicate with one another. The coolant distribution space serves for distributing the coolant over the cooling passages, the coolant collection space for collecting the coolant following the flow through the cooling passages. The coolant distributor and the coolant collection space can be arranged in the axial extension of the stator body and lie opposite one another along the axial direction. The coolant distribution space and the coolant collection space can be arranged or formed at least partially in the second plastic mass. Although the electrically conductive stator windings are usually surrounded with an electrical insulation even during their production in order to prevent that upon contact individual winding portions with one another, electrical short circuits are created. However it cannot be ensured that following the manufacture and assembly of the stator windings, all these windings are continuously equipped with such an insulation. According to the additional method step h2, the second plastic mass bounding the coolant distribution space and/or the coolant collection space and/or the axial end portions of at least one stator winding, preferentially all stator windings present in the stator, are therefore overmoulded and/or sprayed with an electrically insulating insulation material. Preferably, an electrically insulating varnish is used for this purpose. Alternatively or additionally, a plastic mass, in particular the third plastic mass and/or the fourth plastic mass, can also be used. In this way, an undesirable electrical short circuit of the coolant present in the coolant distribution space or in the coolant collection space with the electrically conductive stator windings can be prevented.

Particularly, the overmoulding or spraying according to step h2) is carried out in such a manner that following the overmoulding or spraying neither the second plastic mass nor the axial end portions of the at least one stator winding, preferentially of all stator windings, directly bound the coolant distribution space or the coolant collection space. In this way, an undesirable electrical connection of the electrically conductive stator windings with the coolant present in the coolant distribution space or coolant collection space is excluded.

Particularly preferably, the axial end portions of the at least one stator winding are fixed on the at least one stator tooth in step d) of the method or offset in time thereto, i.e. prior to carrying out step d) or after carrying out step d), by means of a plastic mass, preferentially by means of the second plastic mass.

The invention, furthermore, relates to a stator that has been produced by means of the method explained above. The advantages of the method according to the invention explained above therefore apply also to the stator according to the invention.

The invention, furthermore, relates to an electric machine having the stator mentioned above, which consequently is produced by means of the method according to the invention. The advantages of the method according to the invention explained above therefore apply also to the electric machine according to the invention. Besides the stator, the electric machine also comprises a rotor which is rotatable about an axis of rotation relative to the stator.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description.

BRIEF DESCRIPTION OF THE DRAWINGS

It shows, in each case schematically.

DETAILED DESCRIPTION

Figure 1:
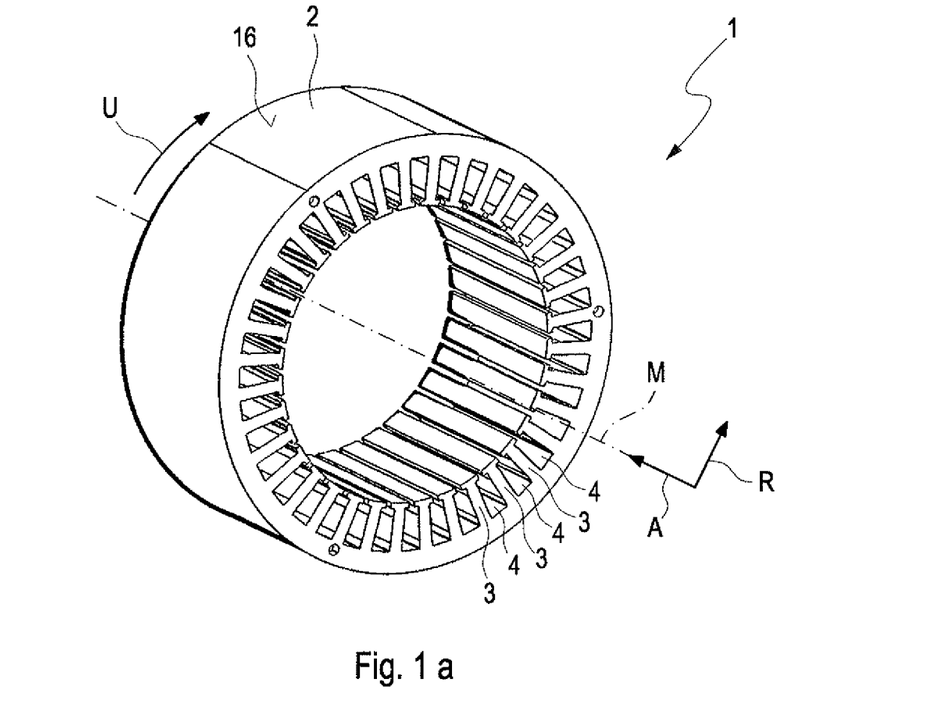
FIGS. 1a and 1b show a stator provided in step a) of the method in different representations.

FIG. 1a illustrates in perspective representation a stator 1 with an annular stator body 2, provided in step a) of the method according to the invention. As is evident from FIG. 1a, multiple stator teeth 3 for receiving stator windings (not shown in FIG. 1) which are arranged spaced from one another along a circumferential direction U of the annular stator body 2 protrude from the stator body 2 radially to the inside. Between two stator teeth 3 that are adjacent in the circumferential direction, an intermediate space 4 is formed in each case, which is also familiar to the person skilled in the art under the term "stator slot". FIG. 1b shows a detail representation of the stator body 2 of FIG. 1a in a detail representation in the region of two stator teeth 3 that are adjacent in the circumferential direction U and in a plan view along an axial direction A, which extends along a centre longitudinal axis M of the stator body 2 and thus runs perpendicularly to the circumferential direction U. A radial direction R extends perpendicularly away from the centre longitudinal axis and thus runs orthogonally both to the axial direction A and also to the circumferential direction U.

At an end portion facing away from the stator body 2, each stator tooth 3 comprises an extension 12a, 12b protruding from the stator tooth 3 in the circumferential direction U and also against the circumferential direction U, so that in each case two extensions 12a, 12b located opposite one another in the circumferential direction U of two stator teeth 3 adjacent in the circumferential direction U partially bound the intermediate space 4 while forming a passage slot 13 radially inside.

Figure 2:
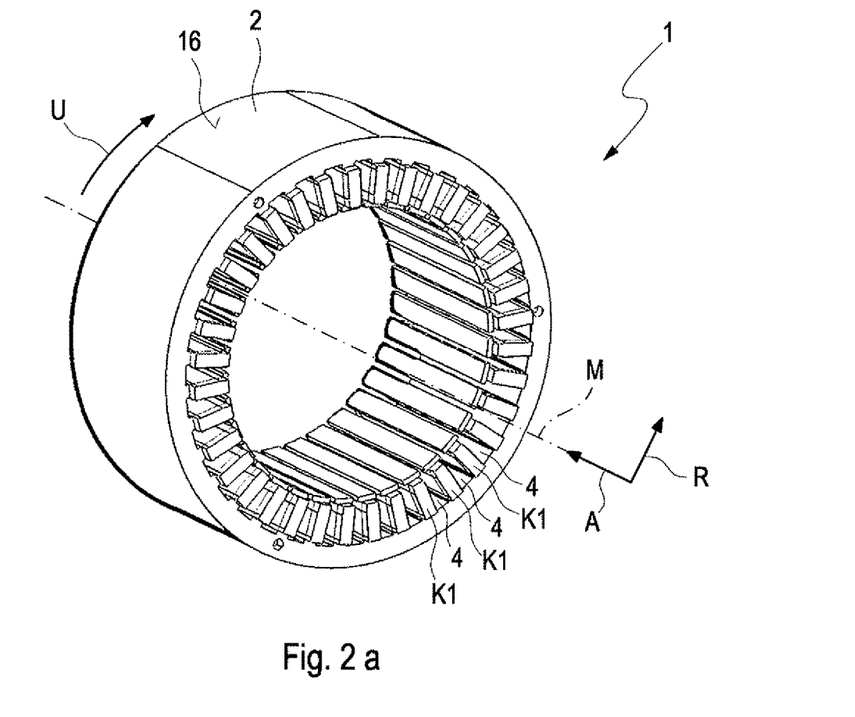
FIGS. 2a, 2b, and 2c show the stator of FIGS. 1a and 1b following the carrying out of step b) in different representations.

In a further method step b), the stator teeth 3 are overmoulded with a first plastic mass K1. The FIGS. 2a and 2b show the stator body 2 following the carrying out of the method step b) in a representation corresponding to the FIGS. 1a and 1b. For illustration, FIG. 2c shows as detail representation of FIG. 2a, multiple adjacent stator teeth 3. Prior to the overmoulding according to step b), a first mask 6a is introduced in each case in the respective intermediate spaces 4 between the stator teeth 3 that are adjacent in the circumferential direction U. This is not shown in the FIGS. 1b and 2b (the mask 6a) is not shown in the FIGS. 1a, 2a and 2c for the sake of clarity). Following the introducing, the first mask 6a covers a surface portion 7, radially bounding the intermediate space radially outside, the so-called slot bottom of the stator body 2, so that the same during the overmoulding according to step d) is not covered or filled out with the first plastic mass K1. The first masks 6a are each introduced into a radially outer end portion 10a of the respective intermediate space 4. The first masks 6a completely fill out the respective radially outer end portion 10a.

Figure 3A:
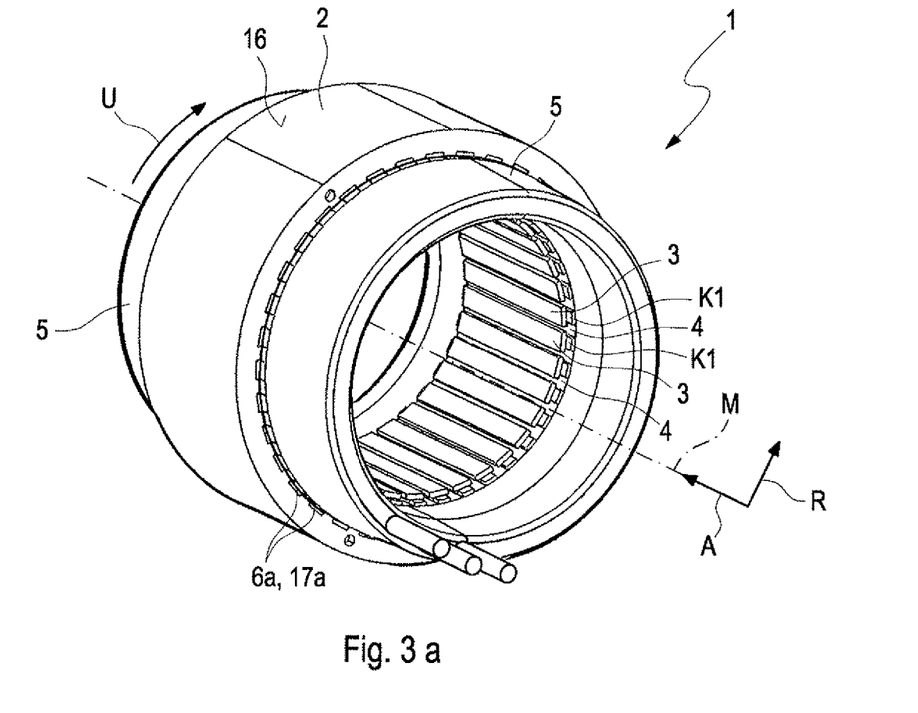
FIGS. 3a, 3b, and 3c show the stator of FIGS. 2a, 2b, and 2c following the carrying out of step c) in different representations.
Figure 3B:
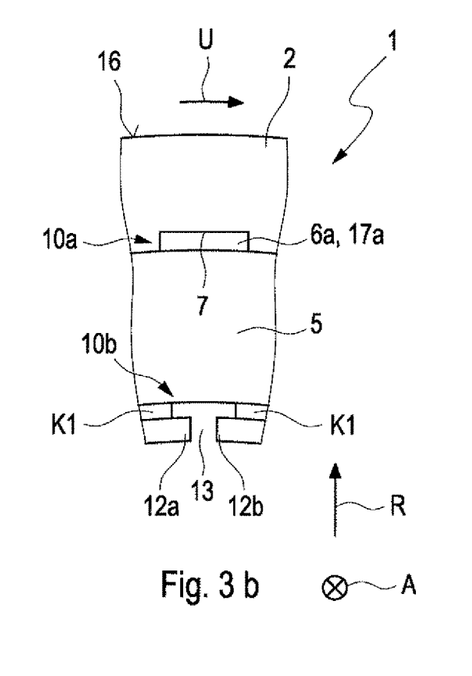
Figure 3C:
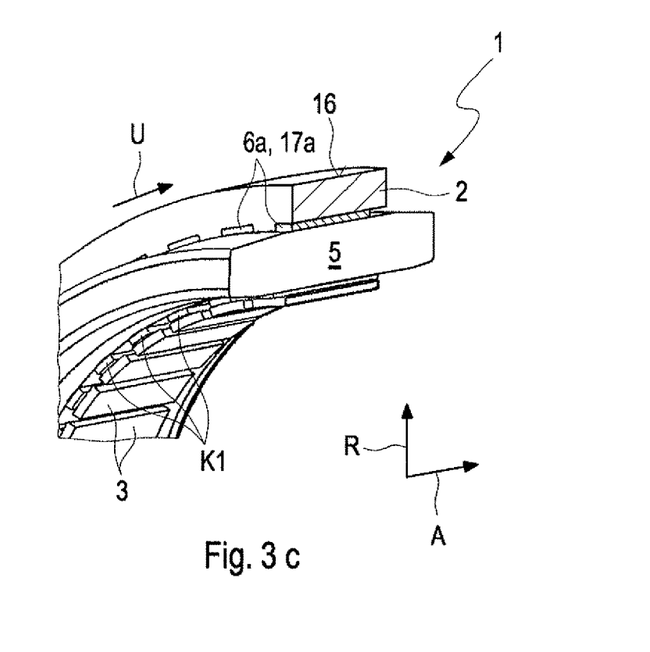

In a further method step c), stator windings 5 are arranged on the stator teeth 3. This is rough-schematically shown in the FIGS. 3a, 3b and 3c, which show the stator body 2 following the carrying out of the method step c) in a representation corresponding to the FIGS. 2a, 2b and 2c.

Figure 4:
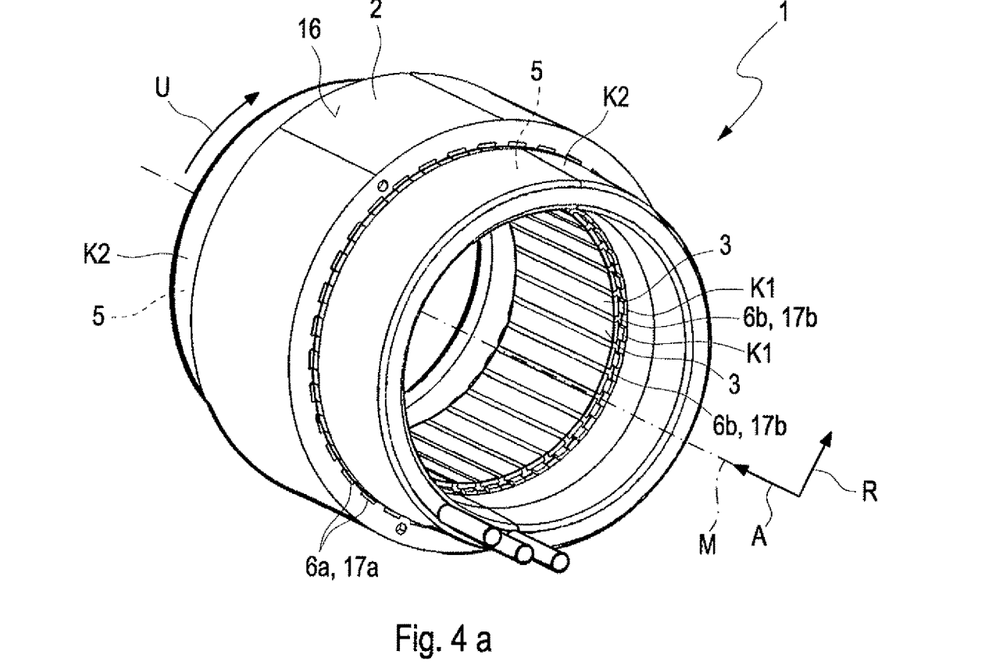
FIGS. 4a, 4b, and 4c show the stator of FIGS. 2a, 2b, and 2c following the carrying out of step d) in different representations.

In a further method step d), the stator windings 5 are fixed on the stator teeth 3 by way of at least partial overmoulding with a second plastic mass K2. This is rough-schematically shown in the FIGS. 4a, 4b and 4c, which show the stator body 2 in a representation corresponding to the FIGS. 3a, 3b and 3c.

Prior to the first overmoulding with the first plastic K1 according to step b), a second mask 6b can be optionally introduced or arranged in an additional method step c') into the passage slots 13 explained above and alternatively or additionally into a region of the intermediate space 4 following the passage slot 13 of the radially inner end portion 10b radially outside. According to FIG. 4b, the second mask 6b can comprise, in a cross section of the stator 1 perpendicular to its centre longitudinal axis, a T-like geometry with a vertical portion 14 and with a horizontal portion 15, wherein the vertical portion 14 fills out the passage slot 13 and the horizontal portion fills out a radially inner end portion 10b of the intermediate space 4 concerned.

Following the overmoulding with the second plastic mass K2, the first masks 6a are again removed from the intermediate spaces 4 in a method step e), so that a hollow space 8 present in each case after the removing of the masks 6a can form a coolant passage 9 for a coolant to flow through. Analogously to the first masks 6a, the second masks 6b, following the overmoulding with the second plastic mask K2, can be again removed from the passage slots 13, so that hollow spaces 8' formed after the removal of the respective second mask 6b each form additional coolant passages 9' for coolant to flow through.

In a further method step f), the second plastic mass K2 bounding the hollow space 8 or coolant passage 9, the stator windings 3 fixed to the stator teeth 2 by means of the second plastic mass K2 and the surface portions 7 of the stator body 2 covered by the (first) masks 6a prior to the removing of the same, are overmoulded with a third plastic mass K3. The method step f) is carried out following the removal of the first masks 6a. The overmoulding with the third plastic mass K3 during the course of step f) is preferably carried out in such a manner that the hollow spaces 8 or coolant passages 9 are fluidically separated from the intermediate space 4 arranged in each case adjacent radially inside not later than after the overmoulding with the third plastic mass K3. In this case, the formed hollow spaces 8 or coolant passages 9 are exclusively bounded by the third plastic mass K3, so that the desired electrical insulation of the stator body 2 relative to the coolant flowing through the coolant passages 9 is ensured.

In a further method step, the second plastic mass K2 bounding the additional coolant passages 9', the stator windings 5 fixed to the stator teeth 3 by means of the second plastic mass K2 and the surface portions of the stator teeth 3 covered by the second masks (6b) prior to the removing of the same, can be overmoulded with a third plastic mass. The overmoulding is effected in such a manner that an additional coolant passage 9' can be formed out of the respective hollow space 8'. The additional coolant passages 9' are each fluidically separated from the intermediate space 4 that is adjacent radially inside not later than after the overmoulding with the third plastic mass K3.

Analogously to the coolant passages 9, the additional coolant passages 9' are also exclusively bounded by the third plastic mass K3. In other words, the overmoulding with the third plastic mass K3 is particularly preferably carried out in such a manner that following the overmoulding with the third plastic mass K3, the additional coolant passages 9' are not directly bounded by the stator windings 5 or by the stator body 2 at any point. As shown in the figures, the second masks 6b can be formed in such a manner that they each do not only fill out the respective passage slot 13 formed between the stator teeth 3 but additionally protrude radially to the outside into the respective intermediate space 4 between the two stator teeth 3, so that the second masks 6b in each case additionally fill out also a radially inner end portion 10b of the intermediate space 4 following the passage slot 13.

Figure 5:
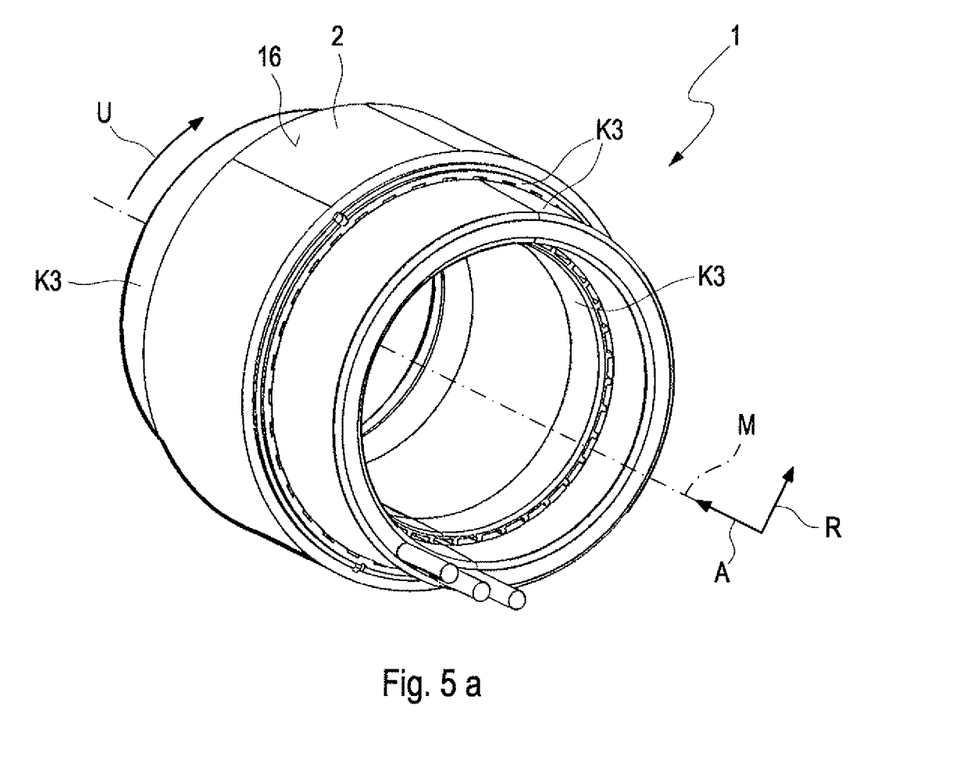
FIGS. 5a, 5b, and 5c show the stator of FIGS. 2a, 2b, and 2c following the carrying out of step e) in different representations.
Figure 6:
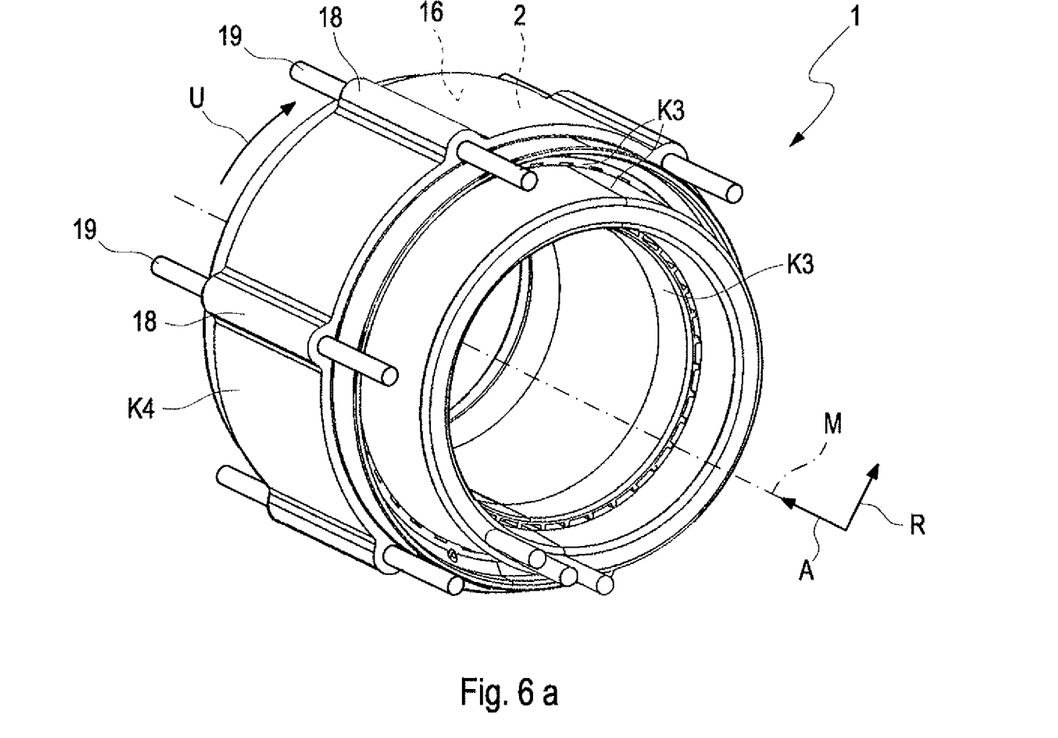
FIGS. 6a and 6b show the stator of FIGS. 2a, 2b, and 2c following the carrying out of step e) in different representations.

In other words, the overmoulding with the third plastic mass K3 is particularly practically carried out in such a manner that following the overmoulding, the hollow spaces 8 or the coolant passages 9 are not directly bounded by the stator windings 5 or by the stator body 2 at any point. In a further method step, at least one outer circumferential side 16 of the stator body 2 can be overmoulded with a fourth plastic mass K4. This is shown in FIGS. 6a and 6b, whose representations correspond to the FIGS. 5a and 5. During the course of the overmoulding with the fourth plastic mass K4, axially extending extensions 18 provided on the outer circumferential side 16 of the stator body 2, as indicated in the FIGS. 6a and 6b, from which axially on the end side threaded rods 19 for fastening a respective bearing shield to the stator body 2 protrude in each case, can likewise be overmoulded with the fourth plastic mass K4. For each threaded rod, a receptacle can be provided in the respective extension 18 which can be formed in particular as a passage opening. In this case, the respective threaded rod 19 engages through the said passage opening.

In a further optional method step, two bearing shields located opposite along the axial direction A can be fastened to the stator body by means of the overmoulded threaded rods 19. This is shown in the FIGS. 7a and 7b for two versions that are alternative to one another. In both versions, a first bearing shield 20a seals a first hollow space 21a provided in the third and fourth plastic mass K3, K4, which forms a coolant distribution space 22a and for this purpose fluidically communicates with the cooling passages 9, 9' present in the stator 1. A second bearing shield (not shown) seals a second hollow space (not shown) formed in the third and fourth plastic mass K3, K4, which forms a coolant collection space (not shown) and for this purpose fluidically communicates with the cooling passages 9, 9' formed in the stator 1. The two bearing shields are axially situated opposite one another along the axial direction A according to the FIGS. 7a and 7b and axially bound the stator body 2 of the stator 1.

Figure 7:
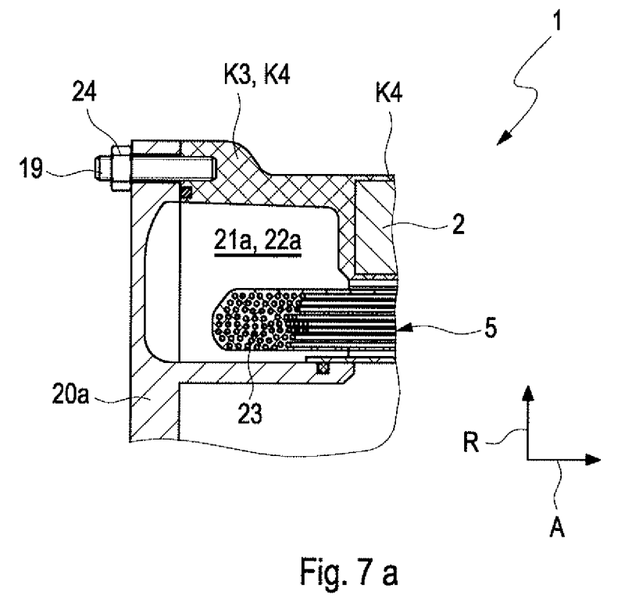
FIGS. 7a and 7b show two versions that are alternative to one another illustrating the method step h).

In the longitudinal section of the stator 1 along the axial direction A according to FIG. 7a, the coolant distribution space 22a and the coolant collection space each have a U-shaped geometry, which partially surround a respective axial end portion 23 of the stator windings 5 in the axial extension and radially outside and radially inside. In the longitudinal section of the stator 1 along the axial direction A according to FIG. 7b, the coolant distribution space 22a and the coolant collection space each have an I-shaped geometry, which partially surround a respective axial end portion of the stator windings 5 in the axial extension and radially outside. Fastening the bearing shields 20a to the stator body 2 is carried out by means of the already mentioned threaded rods 19 provided on the stator body 2 in connection with threaded nuts 24 matched to these threaded rods 19.

The plastic material of the first, second and third plastic mass K1, K2, K3 each comprises a thermosetting plastic or each is a thermosetting plastic. The plastic material K4 of the fourth plastic mass K4 comprises a thermoplastic or is a thermoplastic. The heat conductivity of the fourth plastic mass K4 is lower in each case than the heat conductivity of the first, second and third plastic mass K1, K2, K3. The heat conductivity of the first and of the second plastic mass K1, K2 is higher in each case than the heat conductivity of the third and the fourth plastic mass K3, K4. A coolant resistance of the third plastic mass K3 is practically higher than the coolant resistance of the second or first plastic mass K1, K2.

In a version of the example, the first, second and third plastic mass K1, K2, K3 have the same thermal conductivity. In a version that is alternative thereto, the first, second and third plastic mass K1, K2, K3 can each have different thermal conductivities.

The first and the second masks 6a, 6b can each be formed by an insert 17a, 17b formed plate-like or platelet-like, preferentially of a steel.

According to an optional method step, the second plastic mass K2 initially bounding the coolant distribution space 22a and the coolant collection space can be overmoulded and/or sprayed with an electrically insulating insulation material (not shown). Likewise, axial end portions of the stator windings 6, which can protrude on both sides out of the respective intermediate space 4 along the axial direction A can be overmoulded and/or sprayed with the electrically insulating insulation material. Practically, an electrically insulating varnish is used for this purpose. However it is also conceivable to use the third plastic mass K3 and/or the fourth plastic mass K4 or another suitable plastic mass. The overmoulding or spraying is carried out in such a manner that following the overmoulding or spraying neither the second plastic mass K2 nor the axial end portions of the stator windings 5 directly bound the coolant distribution space 22a or the coolant collection space. In this way, an undesirable electrical connection of the electrically conductive stator windings 6 with the coolant that is present in the coolant distribution space 22a or coolant collection space is excluded.

During the course of step d) or offset in time thereto, i.e. prior to carrying out step d) or after carrying out step d), the axial end portions of the stator windings 5 can also be fixed to the respective stator tooth 3 by means of a plastic mass, in particular by means of the second plastic mass K2.

The invention claimed is:

1. A method for producing a stator for an electric machine, comprising:
    providing an annular stator body including a plurality of stator teeth for receiving a plurality of stator windings, the plurality of stator teeth arranged spaced apart from one another along a circumferential direction of the stator body and protruding from the stator body radially to an inside;
    at least partially overmoulding at least two stator teeth of the plurality of stator teeth that are adjacent in the circumferential direction with a first plastic mass;
    arranging at least one stator winding on at least one stator tooth of the at least two stator teeth;
    fixing the at least one stator winding on the at least one stator tooth via at least partially overmoulding the at least one stator winding with a second plastic mass; and
    prior to fixing the at least one stator winding on the at least one stator tooth, introducing a mask into an intermediate space defined between the at least two stator teeth to cover a surface portion of the stator body bounding the intermediate space radially outside such that the surface portion is not covered with the second plastic mass when at least partially overmoulding the at least one stator winding with the second plastic mass.

2. The method according to claim 1, wherein introducing the mask into the intermediate space includes arranging the mask in a radially outer end portion of the intermediate space.

3. The method according to claim 2, wherein the mask completely fills the radially outer end portion.

4. The method according to claim 1, further comprising removing the mask from the intermediate space after at least partially overmoulding that at least one stator winding with the second plastic mass to form a hollow space that defines a coolant passage for a coolant to flow through.

5. The method according to claim 4, further comprising overmoulding at least one of (i) the second plastic mass bounding the hollow space, (ii) the at least one stator winding fixed to the at least one stator tooth, and (iii) the surface portion of the stator body, with a third plastic mass.

6. The method according to claim 5, wherein overmoulding with the third plastic mass is carried out after removing the mask.

7. The method according to claim 6, wherein the coolant passage is exclusively bounded by the third plastic mass.

8. The method according to claim 5, wherein, following overmoulding with the third plastic mass, the hollow space is not directly bounded at any point by at least one of the at least one stator winding and the stator body.

9. The method according to claim 1, wherein:
    the at least two stator teeth include at least two extensions, the at least two stator teeth each including, on a radially inner end portion facing away from the stator body, at least one extension of the at least two extensions protruding therefrom in the circumferential direction, the at least two extensions disposed opposite one another in the circumferential direction, the at least two extensions forming a passage slot and partially bounding the intermediate space radially inside; and
    the method further comprises, prior to at least partially overmoulding the at least two stator teeth with the first plastic mass, introducing a second mask into at least one of (i) the passage slot and (ii) a radially inner region of the intermediate space disposed following the passage slot.

10. The method according to claim 9, wherein the second mask is introduced into the passage slot, the method further comprising removing the second mask from the passage slot after at least partially overmoulding the at least one stator winding with the second plastic mass to form a hollow space for forming a coolant passage later on.

11. The method according to claim 10, further comprising overmoulding at least one of (i) the second plastic mass bounding the hollow space, (ii) the at least one stator winding fixed to the at least one stator tooth, and (iii) the surface portion of the stator body, with a third plastic mass to form the coolant passage that is fluidically separated from the intermediate space.

12. The method according to claim 11, wherein the coolant passage is exclusively bounded by the third plastic mass.

13. The method according to claim 11, wherein, following overmoulding with the third plastic mass the hollow space is not directly bounded at any point by at least one of the at least one stator winding and the stator body.

14. The method according to claim 9, wherein the second mask completely fills the passage slot and protrudes radially to an outside into the intermediate space such that the second mask additionally fills a radially inner end portion of the intermediate space following the passage slot.

15. The method according to claim 9, wherein:
    the second mask, in a cross section of the stator body perpendicularly to a centre longitudinal axis of the stator body, has a T-like geometry with a vertical portion and with a horizontal portion; and
    the vertical portion fills the passage slot and the horizontal portion fills the radially inner end portion of the intermediate space.

16. The method according to claim 1, wherein the mask is structured as an insert.

17. The method according to claim 1, further comprising overmoulding at least one outer circumferential side of the stator body with a third plastic mass.

18. The method according to claim 17, wherein overmoulding the at least one outer circumferential side of the stator body with the third plastic mass includes overmoulding with the third plastic mass at least one of:
    a plurality of axially extending extensions disposed on the at least one outer circumferential side, the plurality of axially extending extensions each having an end side from which a threaded rod for fastening a respective bearing shield protrudes from the stator body; and
    a plurality of passage openings disposed on the at least one outer circumferential side for receiving a plurality of threaded rods.

19. The method according to claim 1, wherein at least one of the first plastic mass and the second plastic mass at least one of (i) includes a thermosetting plastic and (ii) is composed of the thermosetting plastic.

20. The method according to claim 1, wherein at least one of the first plastic mass and the second plastic mass at least one of (i) includes a thermoplastic and (ii) is composed of the thermoplastic.

21. The method according to claim 17, wherein:
    at least one of a plastic material of the first plastic mass and a plastic material of the second plastic mass at least one of (i) includes a thermosetting plastic and (ii) is composed of the thermosetting plastic; and a plastic material of the third plastic mass at least one of (i) includes a thermoplastic and (ii) is composed of the thermoplastic.

22. The method according to claim 17, wherein a heat conductivity of the third plastic mass is lower than at least one of (i) a heat conductivity of the first plastic mass and (ii) a heat conductivity of the second plastic mass.

23. The method according to claim 17, wherein the first plastic mass, the second plastic mass, and the third plastic mass each have the same thermal conductivity.

24. The method according to claim 17, wherein a coolant resistance of the third plastic mass is higher than at least one of (i) a coolant resistance of the second plastic mass and (ii) a coolant resistance of the first plastic mass.

25. The method according to claim 4, further comprising:
    fluidically connecting a coolant distribution space and a coolant collection space with one another via the coolant passage; and
    at least one of overmoulding and spraying at least one of (i) a portion of the second plastic mass bounding the coolant distribution space, (ii) a portion of the second plastic mass bounding the coolant collection space, and (iii) axial end portions of at least one stator winding with at least one of (i) an electrically insulating insulation material and (ii) a plastic mass.

26. The method according to claim 25, wherein, following the at least one of overmoulding and spraying, neither the second plastic mass nor the axial end portions of the at least one stator winding bound the coolant distribution space or the coolant collection space.

27. The method according to claim 25, wherein the axial end portions of the at least one stator winding are fixed to the at least one stator tooth via the second plastic mass.

28. A stator, produced according to the method of claim 1.

29. An electric machine, comprising:
    a stator produced according to the method of claim 1; and
    a rotor rotatable relative to the stator about an axis of rotation.

\* \* \* \* \*